US012711821B2

(12) United States Patent
Sethuraman et al.

(10) Patent No.: US 12,711,821 B2
(45) Date of Patent: Aug. 18, 2026

(54) METHOD AND SYSTEM FOR AUTOMATICALLY CHANGING A SECURITY LEVEL CONFIGURATION OF A SECURITY SYSTEM OF A FACILITY BASED ON A RECEIVED EVENT PROFILE OF AN EVENT TO BE HELD AT THE FACILITY

(71) Applicant: Honeywell International Inc., Charlotte, NC (US)

(72) Inventors: Raja Sethuraman, Madurai (IN); Rajaboopathi Sekar, Madurai (IN); Poothabalan Somasundaram, Madurai (IN); Jareesh C. Myladan, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 188 days.

(21) Appl. No.: 18/525,106

(22) Filed: Nov. 30, 2023

(65) Prior Publication Data

US 2025/0182548 A1 Jun. 5, 2025

(51) Int. Cl.
*G07C 9/00* (2020.01)
*G07C 9/29* (2020.01)

(52) U.S. Cl.
CPC ........... *G07C 9/00571* (2013.01); *G07C 9/29* (2020.01)

(58) Field of Classification Search
CPC ..... G07C 9/00571; G07C 9/29; H04L 63/107; H04L 63/108; H04L 2463/082; H04L 63/105; H04L 63/20; G06F 21/629; G06F 21/44; G06F 2221/2111; G06F 2221/2113; G06F 2221/2137; G06F 21/62; G06F 21/31; G06F 2221/2139; G06F 2221/2141; G06F 21/00
USPC .......................................................... 340/5.6
See application file for complete search history.

(56) References Cited

U.S. PATENT DOCUMENTS

| | | | |
|---|---|---|---|
| 6,255,988 | B1 | 7/2001 | Bischoff |
| 6,356,282 | B2 | 3/2002 | Roytman et al. |
| 6,400,956 | B1 | 6/2002 | Richton |
| 6,478,233 | B1 | 11/2002 | Shah |
| 6,529,137 | B1 | 3/2003 | Roe |
| 6,604,023 | B1 | 8/2003 | Brown et al. |
| 6,665,613 | B2 | 12/2003 | Duvall |

(Continued)

FOREIGN PATENT DOCUMENTS

| | | | |
|---|---|---|---|
| AU | 2015201441 | A1 | 10/2015 |
| CN | 101689327 | B | 5/2013 |

(Continued)

OTHER PUBLICATIONS

Extended European Search Report, EP Application No. 24212832.0, European Patent Office, Jan. 3, 2025 (12 pages).

(Continued)

*Primary Examiner* — Nam V Nguyen
(74) *Attorney, Agent, or Firm* — Seager, Tufte & Wickhem, LLP

(57) ABSTRACT

An event profile associated with an event to be held at the facility is received. One of a plurality of predetermined security level configurations is selected based at least in part on the received event profile. The security level of at least part of the security system is automatically changed based on the selected one or more of a plurality of predetermined security level configurations.

18 Claims, 6 Drawing Sheets

(56) References Cited

U.S. PATENT DOCUMENTS 6,909,891 B2 6/2005 Yamashita et al.
6,961,001 B1 11/2005 Chang et al.
6,990,335 B1 1/2006 Shamoon et al.
7,046,139 B2 5/2006 Kuhn et al.
7,083,109 B2 8/2006 Pouchak
7,127,734 B1 10/2006 Amit
7,130,719 B2 10/2006 Ehlers et al.
7,155,305 B2 12/2006 Hayes et al.
D535,573 S 1/2007 Barton et al.
7,159,789 B2 1/2007 Schwendinger et al.
7,257,397 B2 8/2007 Shamoon et al.
7,327,250 B2 2/2008 Harvey
7,385,500 B2 6/2008 Irwin
D580,801 S 11/2008 Takach et al.
7,451,017 B2 11/2008 McNally
7,510,126 B2 3/2009 Rossi et al.
7,568,108 B2 * 7/2009 Monaco .................. G07C 9/32
713/182
7,571,865 B2 8/2009 Nicodem et al.
7,614,567 B2 11/2009 Chapman, Jr. et al.
7,636,604 B2 12/2009 Bergman et al.
7,668,532 B2 2/2010 Shamoon et al.
7,768,393 B2 8/2010 Nigam
7,801,646 B2 9/2010 Amundson et al.
7,812,274 B2 10/2010 Dupont et al.
7,908,211 B1 3/2011 Chen et al.
7,949,615 B2 5/2011 Ehlers et al.
7,953,518 B2 5/2011 Kansal et al.
7,973,678 B2 7/2011 Petricoin, Jr. et al.
8,018,329 B2 9/2011 Morgan et al.
8,064,935 B2 11/2011 Shamoon et al.
8,065,342 B1 11/2011 Borg et al.
8,095,340 B2 1/2012 Brown
8,115,656 B2 2/2012 Bevacqua et al.
8,125,332 B2 2/2012 Curran et al.
8,180,492 B2 5/2012 Steinberg
8,195,313 B1 6/2012 Fadell et al.
8,205,244 B2 6/2012 Nightingale et al.
8,232,877 B2 7/2012 Husain
8,255,090 B2 8/2012 Frader-Thompson et al.
8,269,620 B2 9/2012 Bullemer et al.
8,280,536 B1 10/2012 Fadell et al.
8,301,765 B2 10/2012 Goodman
8,332,055 B2 12/2012 Veillette
8,350,697 B2 1/2013 Trundle et al.
8,386,082 B2 2/2013 Oswald
8,390,473 B2 3/2013 Krzyzanowski et al.
8,412,381 B2 4/2013 Nikovski et al.
8,412,654 B2 4/2013 Montalvo
8,428,867 B2 4/2013 Ashley, Jr. et al.
8,433,344 B1 4/2013 Virga
8,442,695 B2 5/2013 Imes et al.
8,457,797 B2 6/2013 Imes et al.
8,509,954 B2 8/2013 Imes et al.
8,531,294 B2 9/2013 Slavin et al.
8,554,374 B2 10/2013 Luncek et al.
8,554,714 B2 10/2013 Raymond et al.
8,571,518 B2 10/2013 Imes et al.
8,587,445 B2 11/2013 Rockwell
8,626,344 B2 1/2014 Imes et al.
8,630,741 B1 1/2014 Matsuoka et al.
8,648,706 B2 2/2014 Ranjun et al.
8,670,783 B2 3/2014 Klein
8,686,841 B2 4/2014 Macheca et al.
8,718,826 B2 5/2014 Ramachandran et al.
8,798,804 B2 8/2014 Besore et al.
8,810,454 B2 8/2014 Cosman
8,812,024 B2 8/2014 Obermeyer et al.
8,812,027 B2 8/2014 Obermeyer et al.
8,840,033 B2 9/2014 Steinberg
8,874,129 B2 10/2014 Forutanpour et al.
8,886,178 B2 11/2014 Chatterjee
8,890,675 B2 11/2014 Ranjan et al.
8,909,256 B2 12/2014 Fraccaroli
8,918,219 B2 12/2014 Sloo et al.
8,941,489 B2 1/2015 Sheshadri et al.
8,965,401 B2 2/2015 Sheshadri et al.
9,000,884 B2 * 4/2015 Son ...................... H04L 63/101
700/83
9,019,070 B2 * 4/2015 Bhandari ................ G07C 9/27
340/5.23
9,026,261 B2 5/2015 Bukhin et al.
9,033,255 B2 5/2015 Tessier et al.
9,055,475 B2 6/2015 Lacatus et al.
9,071,453 B2 6/2015 Shoemaker et al.
9,113,298 B2 8/2015 Qiu
9,167,381 B2 10/2015 McDonald et al.
9,168,927 B2 10/2015 Louboutin
9,183,530 B2 11/2015 Schwarz et al.
9,210,545 B2 12/2015 Sabatelli et al.
9,215,560 B1 12/2015 Jernigan
9,219,983 B2 12/2015 Sheshadri et al.
9,247,378 B2 1/2016 Bisson et al.
9,288,620 B2 3/2016 Menendez
9,292,022 B2 3/2016 Ramachandran et al.
9,307,344 B2 4/2016 Rucker et al.
9,311,685 B2 4/2016 Harkey et al.
9,313,320 B2 4/2016 Zeilingold et al.
9,363,636 B2 6/2016 Ganesh et al.
9,363,772 B2 6/2016 Burks
9,414,422 B2 8/2016 Belghoul et al.
9,432,807 B2 8/2016 Kern, Jr. et al.
9,433,681 B2 9/2016 Constein et al.
9,449,491 B2 9/2016 Sager et al.
9,477,239 B2 10/2016 Bergman et al.
9,495,866 B2 11/2016 Roth et al.
9,521,519 B2 12/2016 Chiou et al.
9,536,073 B2 * 1/2017 Thomas ................. G06F 21/31
9,552,002 B2 1/2017 Sloo et al.
9,560,482 B1 1/2017 Frenz
9,589,435 B2 3/2017 Finlow-Bates
9,594,384 B2 3/2017 Bergman et al.
9,618,227 B2 4/2017 Drew
9,626,841 B2 4/2017 Fadell et al.
9,628,951 B1 4/2017 Kolavennu et al.
9,860,697 B2 1/2018 Frenz
9,898,168 B2 * 2/2018 Shapiro .............. H04L 12/2829
10,057,110 B2 8/2018 Sethuraman et al.
10,516,965 B2 12/2019 Kolavennu et al.
10,605,472 B2 3/2020 Sekar et al.
10,741,044 B1 8/2020 Heintzelman et al.
11,175,793 B2 11/2021 Fulker et al.
11,663,361 B2 * 5/2023 Delaney ................. G06F 21/31
726/2
12,142,382 B2 * 11/2024 Wellig .................. G16H 50/80
2002/0147006 A1 10/2002 Coon et al.
2005/0172056 A1 8/2005 Ahn
2005/0225634 A1 10/2005 Brunetti et al.
2006/0063522 A1 3/2006 McFarland
2006/0080541 A1 4/2006 Monaco et al.
2006/0097063 A1 5/2006 Zeevi
2007/0037605 A1 2/2007 Logan
2007/0099626 A1 5/2007 Lawrence et al.
2007/0114295 A1 5/2007 Jenkins
2007/0249319 A1 10/2007 Faulkner et al.
2008/0094230 A1 4/2008 Mock et al.
2010/0034386 A1 2/2010 Choong et al.
2010/0081375 A1 4/2010 Rosenblatt et al.
2010/0127854 A1 5/2010 Helvick et al.
2010/0156628 A1 6/2010 Ainsbury et al.
2010/0261465 A1 10/2010 Rhoads et al.
2010/0289643 A1 11/2010 Trundle et al.
2011/0153525 A1 6/2011 Benco et al.
2012/0172027 A1 7/2012 Partheesh et al.
2012/0191257 A1 7/2012 Corcoran et al.
2012/0209730 A1 8/2012 Garrett
2012/0259466 A1 10/2012 Ray et al.
2012/0284769 A1 11/2012 Dixon et al.
2013/0073094 A1 3/2013 Knapton et al.
2013/0225196 A1 8/2013 James et al.
2013/0310053 A1 11/2013 Srivastava et al.
2013/0318217 A1 11/2013 Imes et al.
2014/0031989 A1 1/2014 Bergman et al.
2014/0156087 A1 6/2014 Amundson

(56) References Cited

U.S. PATENT DOCUMENTS

| | | | |
|---|---|---|---|
| 2014/0164118 | A1 | 6/2014 | Polachi |
| 2014/0172176 | A1 | 6/2014 | Deilmann et al. |
| 2014/0200718 | A1 | 7/2014 | Tessier |
| 2014/0302879 | A1 | 10/2014 | Kim et al. |
| 2014/0330435 | A1 | 11/2014 | Stoner et al. |
| 2014/0337123 | A1 | 11/2014 | Nuernberg et al. |
| 2014/0370911 | A1 | 12/2014 | Gorgenyi et al. |
| 2015/0094860 | A1 | 4/2015 | Finnerty et al. |
| 2015/0140994 | A1 | 5/2015 | Partheesh et al. |
| 2015/0141045 | A1 | 5/2015 | Qiu et al. |
| 2015/0163631 | A1 | 6/2015 | Quam et al. |
| 2015/0163945 | A1 | 6/2015 | Barton et al. |
| 2015/0186497 | A1 | 7/2015 | Patton et al. |
| 2015/0193936 | A1 | 7/2015 | Warzelhan et al. |
| 2015/0237470 | A1 | 8/2015 | Mayor et al. |
| 2015/0271638 | A1 | 9/2015 | Menayas et al. |
| 2015/0301543 | A1 | 10/2015 | Janoso et al. |
| 2015/0324943 | A1 | 11/2015 | Han et al. |
| 2016/0048128 | A1 | 2/2016 | Schmidt et al. |
| 2016/0057572 | A1 | 2/2016 | Bojorquez Alfaro et al. |
| 2016/0071399 | A1 | 3/2016 | Altman et al. |
| 2016/0142872 | A1 | 5/2016 | Nicholson et al. |
| 2016/0223998 | A1 | 8/2016 | Songkakul et al. |
| 2016/0261424 | A1 | 9/2016 | Gamberini |
| 2016/0286033 | A1 | 9/2016 | Frenz et al. |
| 2016/0313749 | A1 | 10/2016 | Frenz |
| 2016/0313750 | A1 | 10/2016 | Frenz et al. |
| 2018/0160260 | A1 | 6/2018 | Meganathan |

FOREIGN PATENT DOCUMENTS

| | | | | |
|---|---|---|---|---|
| EP | 1515289 | A1 | 3/2005 | |
| EP | 2675195 | A2 | 12/2013 | |
| JP | 2019021241 | A | 2/2019 | |
| JP | 06629105 | B2 | 1/2020 | |
| JP | 2023033845 | A | 3/2023 | |
| MX | 2012000906 | A | 9/2012 | |
| WO | 2009034720 | A1 | 3/2009 | |
| WO | 2009036764 | A2 | 3/2009 | |
| WO | 2011011404 | A1 | 1/2011 | |
| WO | 2012000107 | A1 | 1/2012 | |
| WO | 2013170791 | A1 | 11/2013 | |
| WO | 2014016705 | A2 | 1/2014 | |
| WO | 2014047501 | A1 | 3/2014 | |
| WO | 2014144323 | A1 | 9/2014 | |
| WO | 2014197320 | A1 | 12/2014 | |
| WO | 2014200524 | A2 | 12/2014 | |
| WO | 2015047739 | A1 | 4/2015 | |
| WO | 2015089116 | A1 | 6/2015 | |
| WO | 2017176876 | A1 | 10/2017 | |
| WO | WO-2019199593 | A1 * | 10/2019 | ............. H04L 67/12 |

OTHER PUBLICATIONS

Balaji et al., "Sentinel: Occupancy Based HVAC Actuation Using Existing WiFi Infrastructure Within Commercial Buildings," SenSys '13, 14 pages, Nov. 11-15, 2015.

"Petition for Inter Partes Review of U.S. Pat. No. 8,571,518 Pursuant to 35 U.S.C. 311-319, 37 CFR 42," Inventor Imes et al., dated Oct. 29, 2014.

The Extended European Search Report and Opinion for EP Application No. 16156760.7-1862, dated Jul. 8, 2016.

The Extended European Search Report for EP Application No. 1619416, dated Feb. 2, 2017.

The Extended European Search Report for EP Application No. 16196128.9, dated Mar. 7, 2017.

Do, "Programmable Communicating Thermostats for Demand Response in California," DR ETD Workshop, 26 pages, Jun. 11, 2007.

Gentec, "Feature Focus, Threat Level Management," 2 pages, 2013. aaa.

Green, "PM's Thermostat Guide," Popular Mechanics, pp. 155-158, Oct. 1985.

Gupta et al., "Adding GPS-Control to Traditional Thermostats: An Exploration of Potential Energy Savings and Design Challenges," Pervasive, LNCS 5538, pp. 95-114, 2009.

Gupta, "A Persuasive GPS-Controlled Thermostat System," 89 pages, Sep. 2008.

http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.

http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.

http://www.allure-energy.com/aenf_jan9_12.html, "CES Gets First Look at EverSense," Allure Energy, 2 pages, printed Feb. 17, 2015.

http:/lWww.prnev.tswire.com/nev.ts-releases/allure-energy-unveils-a-combination-of-ibeacon-and-nfc-enabled-smart-sensor-technology-known-as-aura-23885 . . . , "Allure Energy Unveils a Combination of iBeacon and NFC Enabled Smart Sensor Technology Known as Aura," 6 pages, Jan. 6, 2014.

Mobile Integrated Solutions, LLC, "MobiLinc Take Control of Your Home, MobiLinc and Geo-Fence Awareness," 9 pages, downloaded Mar. 27, 2015.

Pan et al., "A Framework for Smart Location-Based Automated Energy Controls in a Green Building Testbed," 6 pages, downloaded Jan. 30, 2015.

SmartThings Inc., "2 Ecobee Si Thermostat + Geofencing," 17 pages, downloaded Nov. 3, 2014.

Honeywell, Honeywell Introduces New All-in-one Self Monitored Smart Home Security System, 9 pages, Nov. 1, 2017.

* cited by examiner

METHOD AND SYSTEM FOR AUTOMATICALLY CHANGING A SECURITY LEVEL CONFIGURATION OF A SECURITY SYSTEM OF A FACILITY BASED ON A RECEIVED EVENT PROFILE OF AN EVENT TO BE HELD AT THE FACILITY

TECHNICAL FIELD

The present disclosure relates generally to security systems and more particularly to automatically-generated event-based changes to security settings within the security system.

BACKGROUND

A number of facilities have security systems. In some cases, the security configuration for the facility may vary from day to day, and between different areas and regions of the facility. As an example, say a particular building has vendors coming for the day. This may involve less stringent security settings for the lobby and the conference room and more stringent security settings for the server room. Variable security settings may include changes in how an individual accesses particular areas and regions of the facility, for example. These configuration changes may be difficult to implement because the security personnel need to manually think through security aspects and determine the appropriate configuration based on the available devices and the current security situation in the facility. This can require significant operator expertise. Also, manually identifying and changing security configurations based on dynamically changing security situations in the facility can be time consuming, tedious and error prone. What would be desirable are methods and systems that automatically identify and/or implement security system configuration changes based on dynamic security situations occurring in the facility.

SUMMARY

The present disclosure relates generally to security systems and more particularly to automatically-generated event-based changes to security settings within the security system. An example may be found in a method for controlling a security level of a security system of a facility. The illustrative method includes receiving an event profile associated with an event to be held at the facility, selecting a selected one or more of a plurality of predetermined security level configurations based at least in part on the received event profile, and automatically changing the security level of at least part of the security system based on the selected one or more of a plurality of predetermined security level configurations.

Another example may be found in a security system for a facility. The illustrative security system includes a plurality of security system sensors, and a controller that is operatively coupled to the security system sensors. The controller is configured to store a plurality of predetermined security level configurations. The controller is configured to identify an event profile associated with an event to be held at the facility, select a selected one or more of the plurality of predetermined security level configurations based at least in part on the identified event profile, and automatically change the security level of at least part of the security system based on the selected one or more of a plurality of predetermined security level configurations.

Another example may be found in a non-transitory computer readable medium storing instructions that when executed by one or more processors, causes the one or more processors to identify an event profile associated with an event to be held at a facility, automatically select a selected one or more of a plurality of predetermined security level configurations based at least in part on the identified event profile, and automatically change the security level of at least part of a security system of the facility based on the selected one or more of a plurality of predetermined security level configurations.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
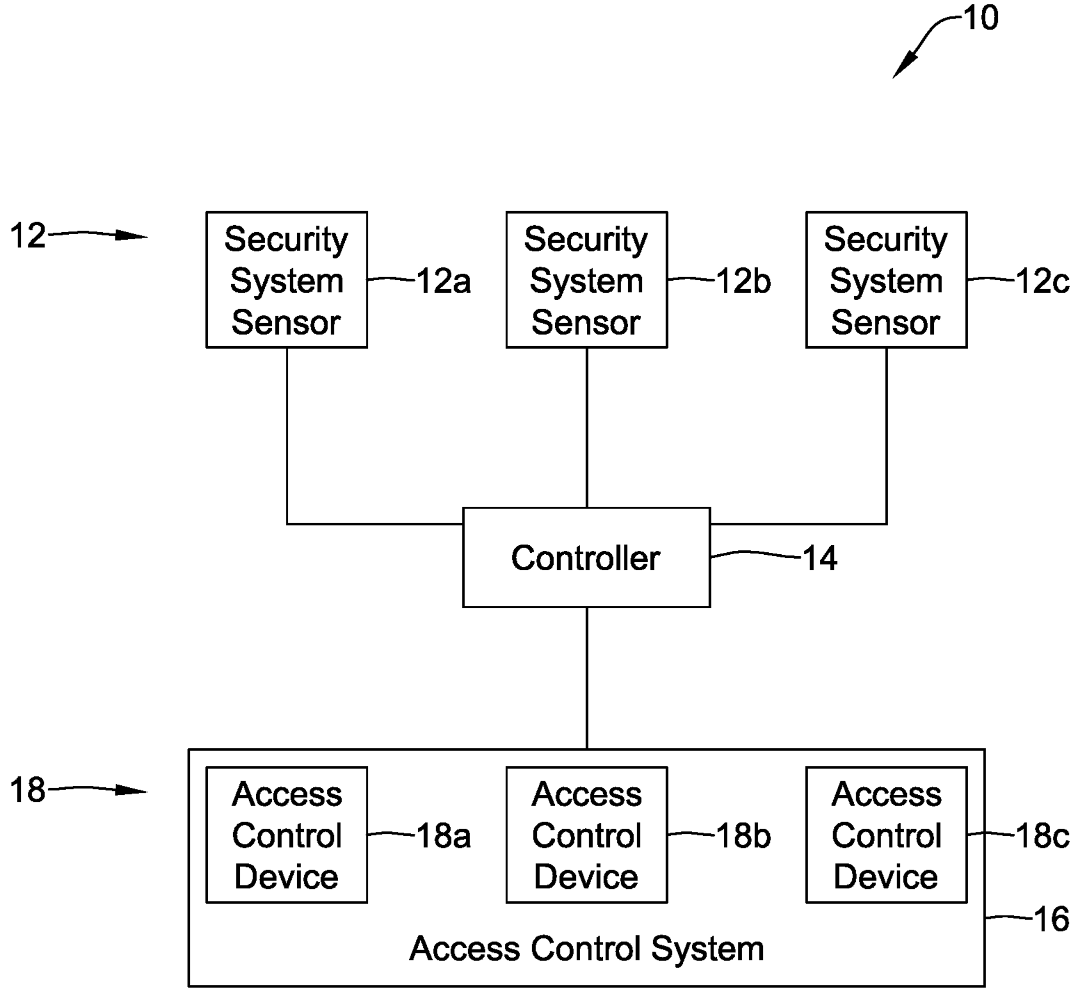
FIG. 1 is a schematic block diagram showing an illustrative security system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative security system 10. The illustrative security system 10 may be installed within a facility for protecting the facility. The security system 10 includes a number of security system sensors 12, individually labeled as 12*a*, 12*b* and 12*c*. While a total of three security system sensors 12 are shown, it will be appreciated that the security system 10 may include any number of security system sensors 12, and in some instances may include substantially more than three security system sensors 12. Each of the security system sensors 12 may represent any of a variety of different types of sensors. For example, each of the security system sensors 12 may be an intrusion sensor such as a door sensor, a window sensor, a glass break sensor, a motion sensor such as a PIR (passive infrared) sensor, a video camera and/or any other type of security system sensor. The security system 10 includes a controller 14 that is operatively coupled to the security system sensors 12. The controller 14 may be located within the facility and may communicate with the security system sensors 12 via a wired or wireless facility network. In some instances, the controller 14 may be remotely located, and may communicate with the security system sensors 12 via a gateway, for example.

In some instances, the security system 10 may further include an access control system 16 that is configured to regulate passage into secured portions of the facility. The illustrative access control system 16 includes a number of access control devices 18, individually labeled as 18*a*, 18*b* and 18*c*. It will be appreciated that the access control system 16 may include any number of access control devices 18, and in some cases may include substantially more than three access control devices 18, particularly in a large facility. The access control devices 18 may be access card readers, door unlock switches and/or any other access control devices. In some instances, the access control devices 18 may include video cameras that perform facial recognition in order to determine whether a particular individual should be allowed access to a particular space, for example. In some instances, the access control system 16 may be controlled by the controller 14. In some instances, the access control system 16 may include its own controller (not shown).

In the example shown, the controller 14 is configured to store a plurality of predetermined security level configurations that may be used in controlling the security system 10. The controller 14 may be configured to identify an event profile associated with an event to be held at the facility. The event profile may include, for example, a visitor profile that identifies one or more characteristics of one or more visitors who will be attending the event. In some cases, at least part of the event profile may be extracted from a meeting calendar event having a list of meeting attendees that will be attending the event, and at least part of the visitor profile may be extracted from the list of meeting attendees. In some instances, the one or more characteristics of the one or more visitors who will be attending the event may include a threat level associated with the one or more visitors to the facility. For example, a higher threat level may be associated with a controversial visitor relative to more conventional visitor. Likewise, a higher threat level may be associated with a high level executive relative to more conventional visitor. These are just examples. In some instances, the event profile may include a confidentiality level associated with the event. For example, a high level board meeting held at the facility may have a higher associated confidentiality level than an open house event. In some instances, at least part of the visitor profile may be extracted from a card swipe of a visitor at an access card reader (such as one of the access control devices 18) of the security system 10. For example, when a high level executive swipes his card at a facility, the security level of the facility may be elevated.

In some cases, the controller 14 is configured to select a selected one or more of the plurality of predetermined security level configurations based at least in part on the identified event profile. In some instances, the controller 14 may be configured to automatically select a security level configuration without operator input. In some cases, the controller may be configured to automatically suggest to an operator a particular one of the plurality of predetermined security level configurations, and give the operator the option to select. In some cases, the controller 14 is configured to automatically change the security level of at least part of the security system based on the selected one or more of a plurality of predetermined security level configurations.

In some instances, the plurality of predetermined security level configurations may define what an individual must do to gain access to a particular space. For example, in a lower security level configuration, an individual may only need to swipe an access card to gain access to a secure region. In a higher security level configuration, an individual may need to perform a two-part verification (e.g. multi-factor authentication) including swiping their access card as well as entering a PIN number, for example. In some cases, the two-part verification may include facial recognition rather than, or in addition to, entering a PIN number. A lower security level configuration may activate fewer security system sensors 12 and/or lower one or more security thresholds associated with some security system sensors 12, while a higher security level configuration may activate additional security system sensors 12 and/or raise one or more security thresholds associated with some security system sensors 12.

Figure 2:
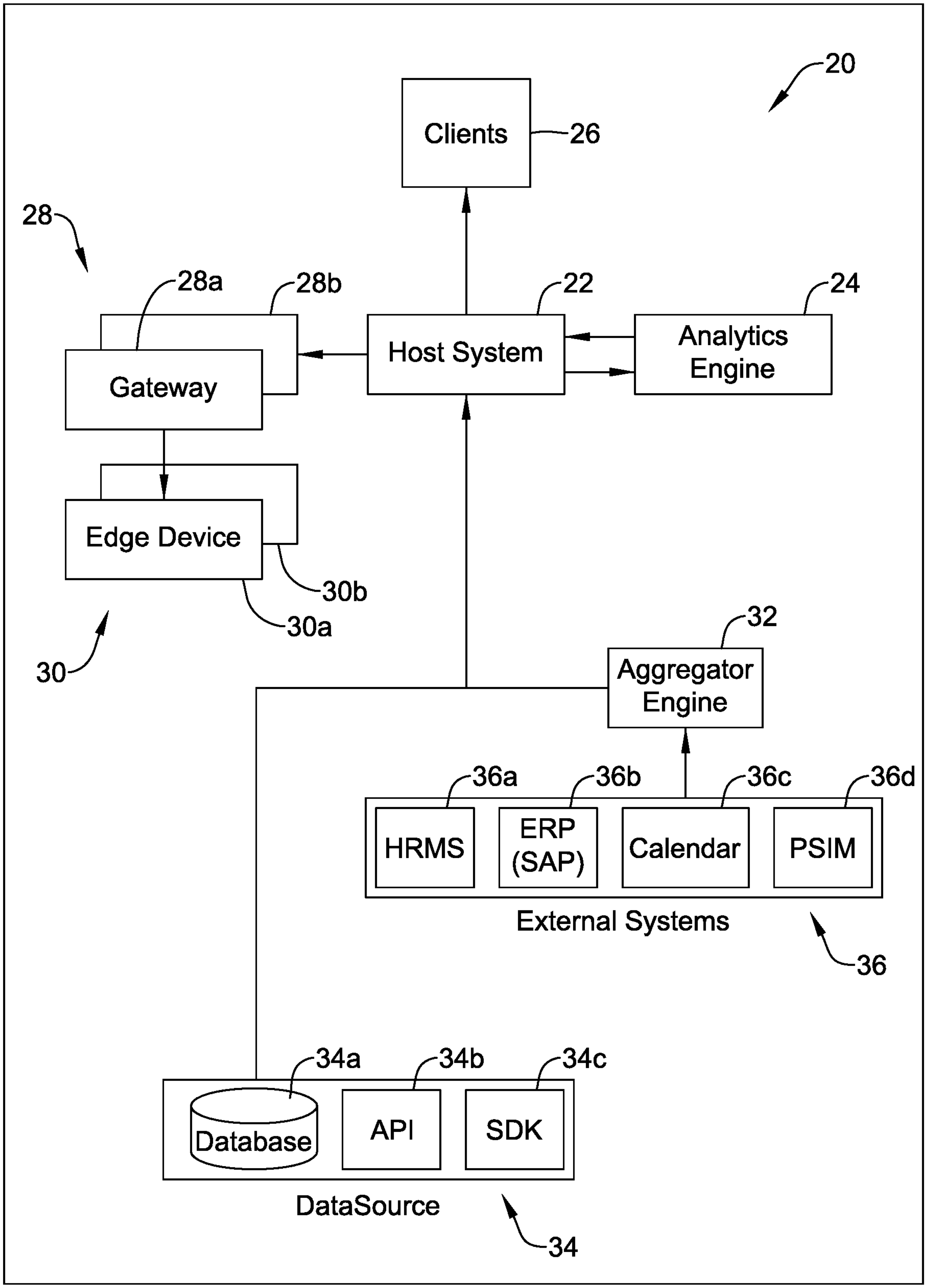
FIG. 2 is a schematic block diagram showing an illustrative architecture that may be implemented in combination with the illustrative security system shown in FIG. 1.

FIG. 2 is a schematic block diagram showing an illustrative architecture 20 that may be implemented in combination with the security system 10. The illustrative architecture 20 includes a host system 22 that provides user profiles to an analytics engine 24 and receives security profiles from the analytics engine 24. In some instances, the analytics engine 24 may be implemented within the controller 14. In some instances, the analytics engine 24 may be cloud-based. The host system 22 provides a security dashboard to clients 26 (e.g. security operators). The host system 22 applies a security profile by communicating with each of a number of gateways 28, individually labeled as 28*a* and 28*b*. The gateways 28 in turn communicate with edge devices 30, individually labeled as 30*a* and 30*b*. In some instances, the controller 14 may be an example of one of the edge devices 30. An aggregator engine 32 may receive data from a variety of data sources 34, including a database 34*a*, an API (application programming interface 34*b* or an SDK (software development kit) 34*c*. The aggregator engine 32 may receive information from external systems 36, including an HRMS (human resources management system) 36*a*, an ERP (SAP) (enterprise planning resource software) 36*b*, a calendar 36*c* or a PSIM (physical security information management) 36*d*. The HRMS 36*a* may be used to identify users associated with a card swipe, a meeting request and/or any other event. The calendar 36*c* may identify scheduled events for the facility and in some cases attendees of the events. The PSIM 36*d* may report card swipe details, facial recognition details, motion events and/or any other events reported by the security system of the facility. The aggregator engine 32 collects this information and provides it to the host system 22. The host system 22 uses the information to determine which users are currently at or are expected to be at the facility, and to provide corresponding user profiles to the analytics engine 24.

Figure 3:
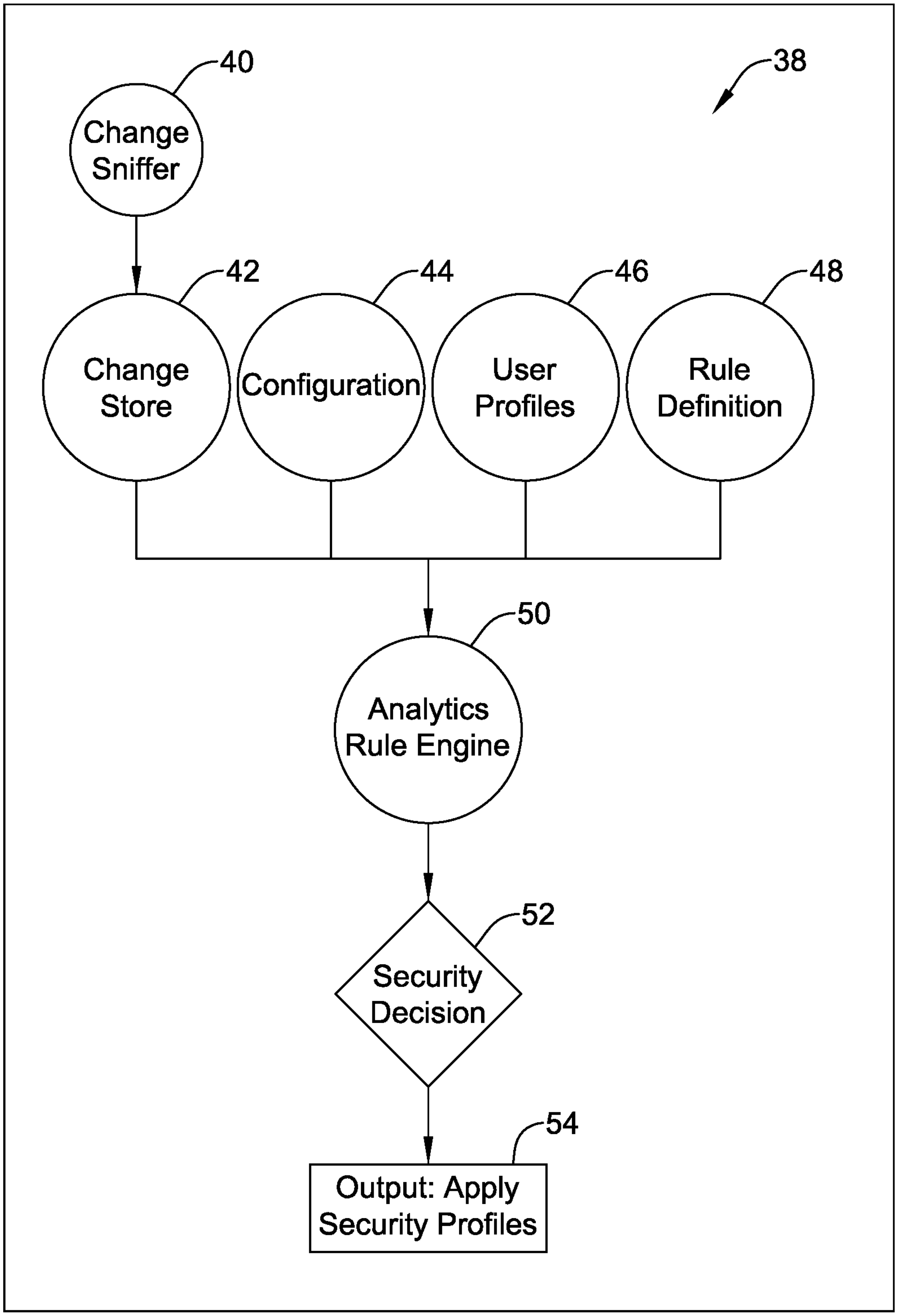
FIG. 3 is a flow diagram showing an illustrative dataflow through the analytics engine shown in FIG. 2.

FIG. 3 is a flow diagram showing an illustrative dataflow 38 of the analytics engine 24 (FIG. 2). A change sniffer 40 detects changes such as changes to the normal day to day operation of the facility and reports to a change store 42. The changes may include, for example, a card swipe event, a motion event, a facial recognition event, a scheduled event and/or any other change occurring in the operation of the facility. A configuration block 44, a user profiles block 46 and a rule definition block 48 each provide information to an analytics rule engine 50. The analytics rule engine 50 outputs a security decision 52 and provides an output 54 in which a security profile is implemented by changing one or more security level configurations of a security system (such as security system 10).

Figure 4:
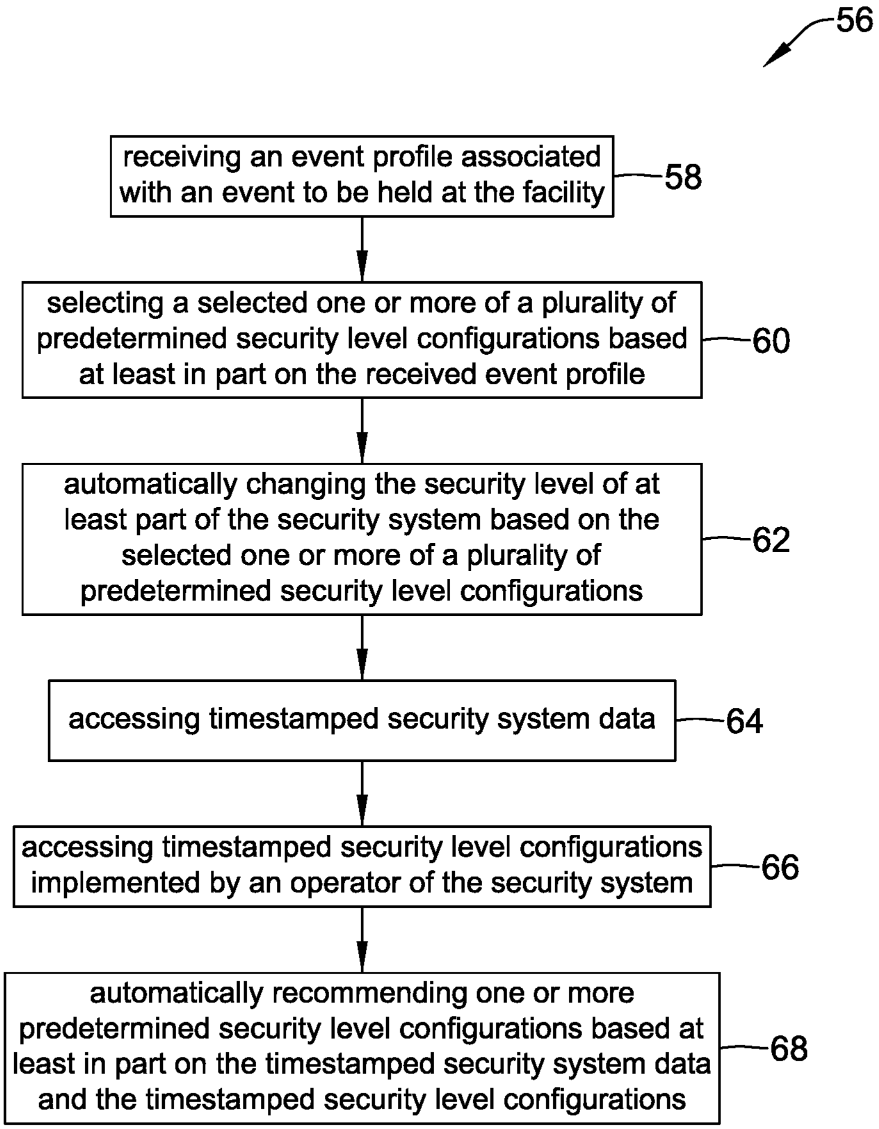
FIG. 4 is a flow diagram showing an illustrative method for controlling a security level of the illustrative security system of FIG. 1.

FIG. 4 is a flow diagram showing an illustrative method 56 for controlling a security level of a security system (such as the security system 10) of a facility. The illustrative method 56 includes receiving an event profile associated with an event to be held at the facility, as indicated at block 58. In some instances, the event profile may include a visitor profile, wherein the visitor profile identifies one or more characteristics of one or more visitors who will be attending the event. In some cases, at least part of the event profile may be extracted from a meeting calendar event (e.g. from calendar 36*c*) having a list of meeting attendees, and wherein at least part of the visitor profile may be extracted from the list of meeting attendees. In some instances, at least part of the visitor profile may be extracted from a card swipe of a visitor at an access card reader of the security system. The one or more characteristics of the one or more visitors who will be attending the event may include a threat level associated with the one or more visitors. Alternatively, or in addition, the event profile may include a confidentiality level associated with the event.

A selected one or more of a plurality of predetermined security level configurations is selected based at least in part on the received event profile, as indicated at block 60. The security level of at least part of the security system is automatically changed based on the selected one or more of a plurality of predetermined security level configurations, as indicated at block 62. In some instances, the selected one or more of the plurality of predetermined security level configurations may be automatically selected based at least in part on the received event profile without operator input. In some cases, the selected one or more of the plurality of predetermined security level configurations may be manually selected by an operator from one or more security level configurations automatically suggested by the system.

In some instances, automatically changing the security level of at least part of the security system based at least in part on the received event profile may include activating one or more security functions of the security system that were previously deactivated and/or changing one or more sensitivity thresholds of one or more security functions of the security system. As an example, the one or more security functions may include activating one or more video analytics algorithms that were previously deactivated. As another example, the one or more security functions may include activating one or more security system sensors and/or changing one or more sensitivity thresholds of one or more of the security system sensors. These are just examples.

In some instances, the method 56 may further include accessing timestamped security system data, as indicated at block 64, and accessing timestamped security level configuration changes implemented by an operator of the security system, as indicated at block 66. The method 56 may include automatically recommending one or more predetermined security level configurations based at least in part on the timestamped security system data and the timestamped security level configurations, as indicated at block 68.

Figure 5:
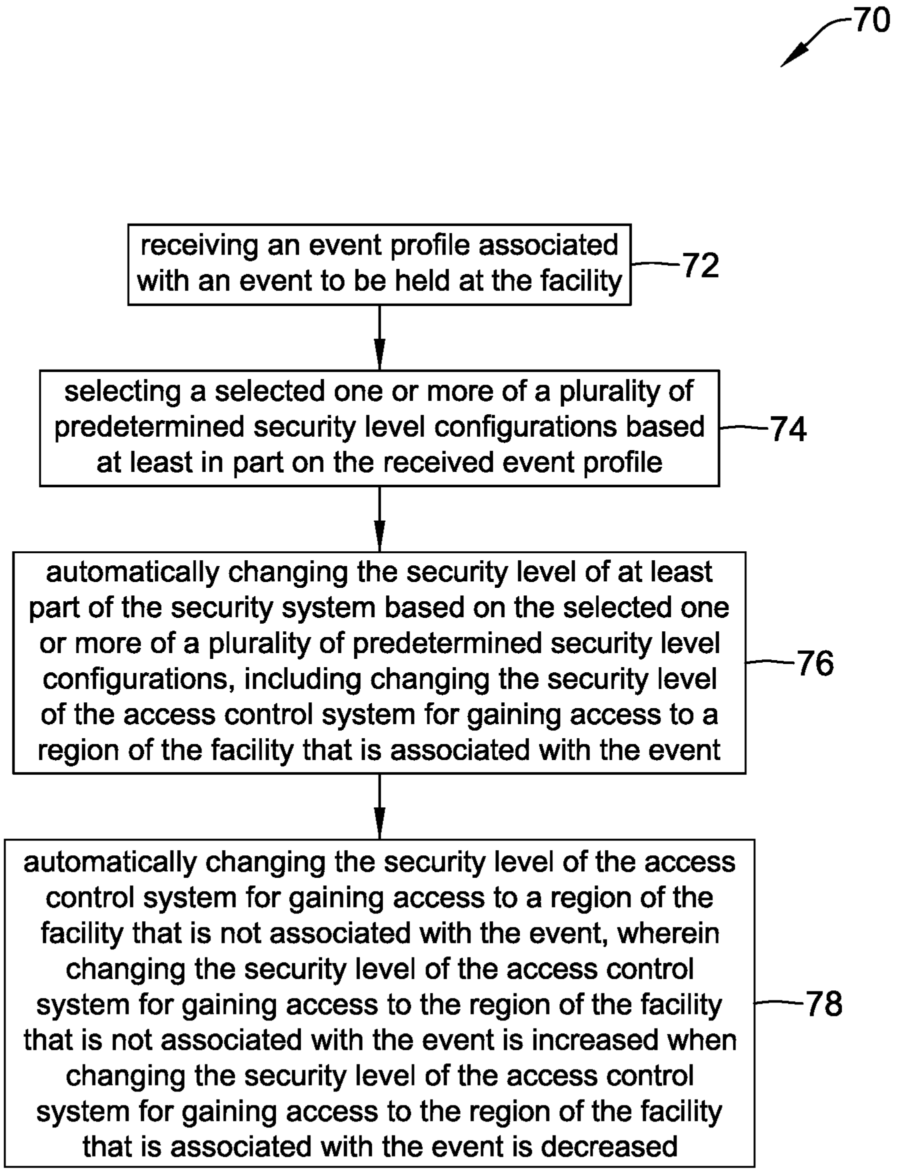
FIG. 5 is a flow diagram showing an illustrative method for controlling a security level of the illustrative security system of FIG. 1.

FIG. 5 is a flow diagram showing an illustrative method 70 for controlling a security level of a security system (such as the security system 10) of a facility. The illustrative method 70 includes receiving an event profile associated with an event to be held at the facility, as indicated at block 72. In some instances, the event profile may include a visitor profile, wherein the visitor profile identifies one or more characteristics of one or more visitors who will be attending the event. In some cases, at least part of the event profile may be extracted from a meeting calendar event having a list of meeting attendees, and wherein at least part of the visitor profile may be extracted from the list of meeting attendees. In some instances, at least part of the visitor profile may be extracted from a card swipe of a visitor at an access card reader of the security system. The one or more characteristics of the one or more visitors who will be attending the event may include a threat level associated with the one or more visitors. The event profile may include a confidentiality level associated with the event.

A selected one or more of a plurality of predetermined security level configurations is selected based at least in part on the received event profile, as indicated at block 74. The method 70 includes automatically changing the security level of at least part of the security system based on the selected one or more of a plurality of predetermined security level configurations, including changing the security level of the access control system for gaining access to a region of the facility that is associated with the event, as indicated at block 76. As an example, changing the security level of the access control system for gaining access to the region of the facility that is associated with the event may include changing a security protocol from single-factor authentication to multi-factor authentication for gaining access to the region of the facility that is associated with the event. In some instances, the method 70 also includes automatically changing the security level of the access control system for gaining access to a region of the facility that is not associated with the event. In some cases, the security level of the access control system for gaining access to the region of the facility that is not associated with the event is increased when the security level of the access control system for gaining access to the region of the facility that is associated with the event is decreased, as indicated at block 78. For example, when an open house is held in a lobby of the facility, the security level of the access control system for gaining access to the lobby may be decreased (open door policy) during the event, while the security level of the access control system for gaining access to other areas of the facility, such as a server room or a laboratory, may be increased during the event (e.g. multi-factor authentication).

Figure 6:
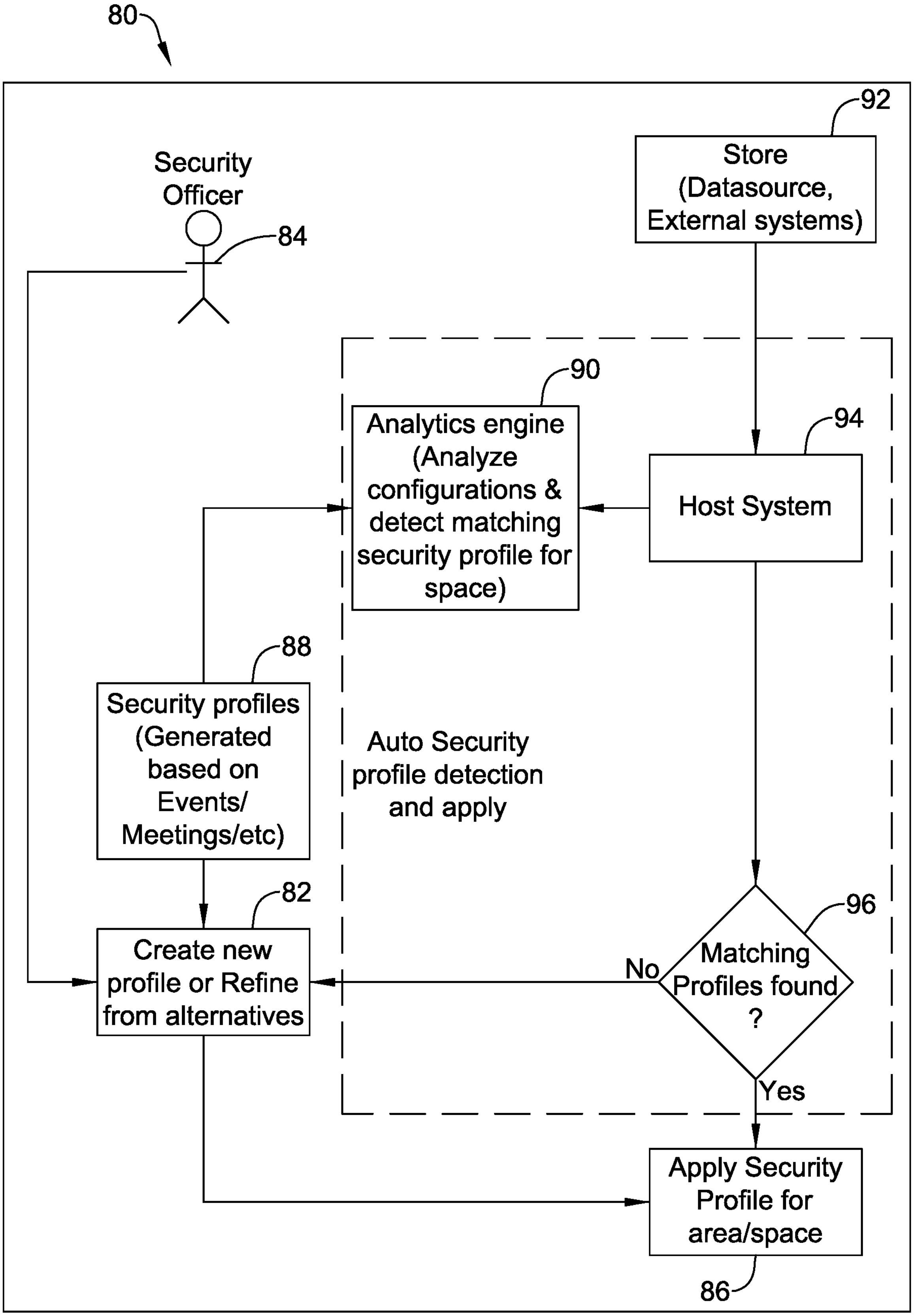
FIG. 6 is a flow diagram showing an illustrative method for self-learning.

FIG. 6 is a flow diagram showing an illustrative method 80 for self-learning security profiles for the facility based on security system and other available data. A library of security profiles, which are generated over time based on security system and other available data, is stored at block 88. The library of security profiles are made available to an analytics engine 90 (may be a representation of the analytics engine 24 shown in FIG. 2). Information such as schedules and planned events are provided from a block 92 to a host system 94 (may be a representation of the host system 22 shown in FIG. 2). The host system 94 may access the analytics engine 90 and generate a security profile. The generated security profile may be provided to block 96. Block 96 searches for a matching security profile in the library of security profiles. If a matching security profile is found, control passes to block 86 where the matching security profile is applied. If no match is found, control passes to block 82, and a suggested new security profile is created, sometimes based on a refinement from one or more of the security profiles of the library of security profiles. The suggested new security profile is presented to a security operator 84, and if approved by the security operator 84, the suggested new security profile is added to the security profile library at 88. Each security profile defines a plurality of predetermined security level configurations for the security system. Over time, the library of security profiles accumulates more and more approved security profiles that can quickly and easily adapt the security system to ever more event variations in the facility.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for controlling a security level of a security system of a facility, the method comprising:

receiving an event profile associated with an event to be held at the facility;

selecting a selected one or more of a plurality of predetermined security level configurations based at least in part on the received event profile; and automatically changing the security level of at least part of the security system based on the selected one or more of a plurality of predetermined security level configurations;

wherein the security system includes an access control system, and wherein automatically changing the security level of at least part of the security system includes changing the security level of the access control system for gaining access to a region of the facility that is associated with the event; and the method further comprises:

automatically changing the security level of the access control system for gaining access to a region of the facility that is not associated with the event, wherein changing the security level of the access control system for gaining access to the region of the facility that is not associated with the event is increased when changing the security level of the access control system for gaining access to the region of the facility that is associated with the event is decreased.

2. The method of claim 1, wherein the event profile includes a visitor profile, wherein the visitor profile identifies one or more characteristics of one or more visitors who will be attending the event.

3. The method of claim 2, wherein at least part of the event profile is extracted from a meeting calendar event having a list of meeting attendees, and wherein at least part of the visitor profile is extracted from the list of meeting attendees.

4. The method of claim 2, wherein at least part of the visitor profile is extracted from a card swipe of a visitor at an access card reader of the security system.

5. The method of claim 2, wherein the one or more characteristics of the one or more visitors who will be attending the event include a threat level presented to the one or more visitors.

6. The method of claim 2, wherein the one or more characteristics of the one or more visitors who will be attending the event include a threat level associated with the one or more visitors to the facility.

7. The method of claim 1, wherein the event profile includes a confidentiality level associated with the event.

8. The method of claim 1, wherein the selected one or more of the plurality of predetermined security level configurations is automatically selected based at least in part on the received event profile without operator input.

9. The method of claim 1, wherein changing the security level of the access control system for gaining access to the region of the facility that is associated with the event includes changing a security protocol from single-factor authentication to multi-factor authentication for gaining access to the region of the facility that is associated with the event.

10. The method of claim 1, wherein automatically changing the security level of at least part of the security system based at least in part on the received event profile includes activating one or more security functions of the security system that were previously deactivated.

11. The method of claim 10, wherein the one or more security functions include activating one or more video analytics algorithms.

12. The method of claim 10, wherein the one or more security functions include activating one or more security system sensors and/or changing one or more sensitivity thresholds of one or more of the security system sensors.

13. The method of claim 1, comprising:

accessing timestamped security system data;

accessing timestamped security level configurations implemented by an operator of the security system; and automatically recommending one or more predetermined security level configurations based at least in part on the timestamped security system data and the timestamped security level configurations.

14. A security system for a facility, comprising:

a plurality of security system sensors;

an access control system;

a controller operatively coupled to the security system sensors, the controller configured to:

store a plurality of predetermined security level configurations;

identify an event profile associated with an event to be held at the facility;

select a selected one or more of the plurality of predetermined security level configurations based at least in part on the identified event profile; and automatically change the security level of at least part of the security system based on the selected one or more of a plurality of predetermined security level configurations, including changing the security level of the access control system for gaining access to a region of the facility that is associated with the event; and automatically change the security level of the access control system for gaining access to a region of the facility that is not associated with the event, further wherein the controller is configured to automatically increase the security level of the access control system for gaining access to the region of the facility that is not associated with the event and decrease the security level of the access control system for gaining access to the region of the facility that is associated with the event.

15. The security system of claim 14, wherein the selected one or more of the plurality of predetermined security level configurations is automatically selected based at least in part on the received event profile without operator input.

16. The security system of claim 14, wherein the event profile includes a visitor profile, wherein the visitor profile identifies one or more characteristics of one or more visitors who will be attending the event.

17. A non-transitory computer readable medium storing instructions that when executed by one or more processors causes the one or more processors to:

identify an event profile associated with an event to be held at a facility;

automatically select a selected one or more of a plurality of predetermined security level configurations based at least in part on the identified event profile, wherein the security system includes an access control system; and automatically change the security level of at least part of a security system of the facility based on the selected one or more of a plurality of predetermined security level configurations, including decreasing the security level of the access control system for gaining access to a region of the facility that is associated with the event, and increasing the security level of the access control system for gaining access to a region of the facility that is not associated with the event.

18. The non-transitory computer readable medium of claim 17, wherein the event profile includes a visitor profile, wherein the visitor profile identifies one or more characteristics of one or more visitors who will be attending the event.

* * * * *